United States Patent [19]

Nicholas et al.

[11] Patent Number: 4,988,490
[45] Date of Patent: Jan. 29, 1991

[54] ADSORPTIVE PROCESS FOR RECOVERING NITROGEN FROM FLUE GAS

[75] Inventors: David M. Nicholas, New Tripoli; Joseph P. Bushinsky; Ravi Kumar, both of Allentown; Wilbur C. Kratz, Macungie, all of Pa.

[73] Assignee: Air Products and Chemicals, Inc., Allentown, Pa.

[21] Appl. No.: 244,429

[22] Filed: Sep. 14, 1988

[51] Int. Cl.$^5$ ............................................. C01B 21/00
[52] U.S. Cl. .................................... 423/351; 252/376; 423/359; 423/652
[58] Field of Search .................. 423/351, 359, 652; 252/376

[56] References Cited

U.S. PATENT DOCUMENTS

| | | | |
|---|---|---|---|
| 2,826,480 | 3/1958 | Webster | 423/351 |
| 3,145,085 | 8/1964 | Breault | 423/351 |
| 3,240,554 | 3/1966 | Angerhofer | 423/351 |
| 4,203,958 | 5/1980 | Snarski | 55/25 |
| 4,337,170 | 6/1982 | Fuderer | 252/373 |
| 4,348,213 | 9/1982 | Armond | 55/25 |
| 4,477,264 | 10/1984 | Kratz et al. | 55/25 |
| 4,479,925 | 10/1984 | Shires et al. | 423/359 |
| 4,778,670 | 10/1988 | Pinto | 423/652 |
| 4,814,156 | 3/1989 | Pinto | 423/351 |
| 4,895,710 | 1/1990 | Hartmann et al. | 423/351 |

FOREIGN PATENT DOCUMENTS

| | | | |
|---|---|---|---|
| 529368 | 8/1956 | Canada | 423/351 |
| 0113198 | 12/1983 | European Pat. Off. | |
| 0157480 | 2/1985 | European Pat. Off. | |
| 3101067 | 1/1981 | Fed. Rep. of Germany | |
| 116396 | 9/1979 | Japan | 423/351 |
| 2179366 | 8/1985 | United Kingdom | |

Primary Examiner—Wayne A. Langel
Attorney, Agent, or Firm—John M. Fernbacher; James C. Simmons; William F. Marsh

[57] ABSTRACT

Nitrogen is economically recovered from the flue gas evolved in a hydrocarbon steam reforming furnace by hydrogenation of free oxygen therein and removal of carbon dioxide and other minor impurities from the flue gas by pressure swing adsorption with recovery of high purity nitrogen as unsorbed effluent. The process is utilized to highest advantage in the production of ammonia syngas wherein natural gas or other hydrocarbon feed is subjected to steam reforming in a fuel-fired furnace. The nitrogen obtained by purification of the flue gas is combined with the purified hydrogen separated from the reformate providing the syngas for conversion to ammonia. In a preferred embodiment, the steam reforming is carried out in two stages, the first stage being performed in a conventional fuel-fired steam reforming furnace to which a major portion of the fresh hydrocarbon feed is charged. The hot effluent from this first reforming stage is employed as the heating medium to support reforming of the remaining minor portion of the fresh feed by heat exchange therewith.

7 Claims, 9 Drawing Sheets

Ad – ADSORPTION STEP
PE – PRESSURE EQUALIZATION
DP – DEPRESSURIZATION
Pur. – PURGE STEP
Pr. PRESSURIZATION STEP

TWO BED PROCESS

THREE BED PROCESS

ADSORPTIVE PROCESS FOR RECOVERING NITROGEN FROM FLUE GAS

TECHNICAL FIELD

The present invention is concerned with the production and recovery of nitrogen at high yield and lower energy requirement than that obtained in conventional operations.

BACKGROUND OF THE INVENTION

Nitrogen is most commonly prepared by the fractional distillation of liquid air or by pressure swing adsorption (PSA) from atmospheric air. Although nitrogen is widely available for use as an inerting gas and as a component in various syntheses reactions among other widely diversified uses, it is still relatively expensive, and cheaper nitrogen sources would be highly beneficial for use in ammonia synthesis and other industrial applications.

In the recovery of nitrogen from atmospheric air by selective adsorption in a pressure swing system, the feed air needs to be compressed and/or a vacuum pump employed for reduction of bed pressure. Nitrogen recovery by PSA is rather low (~40-50%) and the mechanical power required constitutes a substantial part of the nitrogen production cost. In the cryogenic air fractionation process, likewise, the feed air needs to be compressed (to about 100 psi) and cooled prior to distillation.

In the synthesis of ammonia by the combination of nitrogen and hydrogen over a catalyst, the hydrogen is commonly produced by steam reforming of methane (SMR), natural gas or other low molecular weight hydrocarbons. The nitrogen can be supplied from a cryogenic air separation plant. However, it is now more common to employ in combination with the primary steam reforming furnace a secondary reformer in which air is injected in an amount to provide the proper $H_2/N_2$ ratio.

PRIOR ART

A typical prior art sequence for ammonia synthesis is disclosed in U.S. Pat. No. 4,479,925 employing steam reforming followed by air reforming of the hydrocarbon feed. The obtained reformate is subjected to shift reaction for conversion of contained CO to $CO_2$, removal of $CO_2$ by liquid absorption followed by methanation before introduction of the product into the ammonia synthesis system. A flow diagram of the conventional process is shown at Pate 488 of Kirk-Othmer (third ed.) Encyclopedia of Chemical Technology.

U.S. Pat. No. 4,337,170 discloses use of a reformer exchanger in steam-methane reforming wherein the methane-rich feed plus steam is split between a conventional fuel-fired steam reformer furnace and a heat exchanger reformer unit. The major portion of the feed stream, with added steam, is charged to the primary fuel-fired furnace while the remaining minor portion of the fresh feed mixed with steam is charged directly into the catalyst-containing tubes of the reformer-exchanger. Within the reformer-exchanger the reformed effluent from the fuel-fired furnace is mixed with the effluent at the discharge end of the catalyst tubes. The thus combined product stream passes on the shell side of the reformer exchanger in indirect heat exchange to the reaction mixture in the tubes, and after cooling to suitable temperature, undergoes conventional shift conversion of contained CO, followed by separation in a pressure swing adsorbent unit to recover hydrogen, the waste gas resulting being used as fuel in the primary reforming furnace. In a second disclosed embodiment the partially reformed product from the primary fuel-fired furnace is passed through a secondary reforming zone where it is further reacted in the pressure of added oxygen and the secondary reformate is sent to the reformer-exchanger. Instead of oxygen, air may be employed in the secondary reformer, particularly when ammonia syngas is to be produced instead of pure hydrogen.

European Patent Application No. 0 113 198 A2 (published Jul. 11, 1984) describes the production of ammonia syngas by primary steam reforming a methane-rich feed in a tubular heat exchanger reactor utilizing secondary air reformer effluent as the heating medium in the primary reformer.

European Patent Application No. 0 157 480 A2 (published Oct. 9, 1985) is directed to production of ammonia synthesis gas from a raw gas mixture obtained by primary and secondary reforming of a hydrocarbon feed. The raw gas mixture which comprises hydrogen, nitrogen and minor impurities, after undergoing shift conversion of contained CO is subjected to pressure swing adsorption for removal of $CO_2$ followed by methanation, before being introduced into the ammonia convertor. The reforming furnace shown in the published patent application is in the form of an integrated structure in which the primary steam reformer is housed within the secondary reformer section, the primary steam reformate discharged being mixed with air and passed into the secondary reformer and the produced secondary reformate being passed in indirect heat exchange around the wall of the primary reformer section.

UK patent application, published Mar. 4, 1987 as GB 2179366A, discloses a process for production of synthesis gas having a stoichiometric composition desirable for conversion to methanol or Fischer-Tropsch products ($H_2/CO=2$). The hydrocarbon feed gas mixed with steam and $CO_2$ is subjected to primary reforming in an exchange reactor producing a partially reformed product as primary effluent. The primary effluent is mixed with additional fresh hydrocarbon gas, $CO_2$, oxygen-containing gas and more steam and charged to a secondary reformer. The effluent from the secondary reformer is employed as the indirect heat exchange medium in the exchange reactor.

West German Patent Application No. 3101067A1 (published Jul. 22, 1982) discloses a process for production of ammonia synthesis gas wherein the nitrogen component is supplied from blast furnace discharge gas, which is added to the product obtained from steam reforming of a hydrocarbon charge. The mixed gas is subjected to the conventional steps of CO shift conversion, $CO_2$ removal and methanation prior to introduction into the ammonia synthesis conversion reaction; the off-gas from the ammonia synthesis is recycled for use as fuel in the steam (cracking) reforming furnace.

SUMMARY OF THE INVENTION

In accordance with the present invention, nitrogen is produced and recoverd at high yield and reduced cost by a novel process wherein the source of the nitrogen is the flue gas obtained in combustion of hydrocarbon fuel with air supplied to a steam methane reforming furnace.

The thus obtained flue gas is predominantly comprised of nitrogen (~90%) and carbon dioxide and is otherwise relatively clean. In practice of the invention, the flue gas is cooled and then compressed; after removal of condensed water, residual-free oxygen therein is removed by hydrogenation. The oxygen-freed product, containing a total of about 99% $CO_2$ and $N_2$ and about 1% of argon, is charged to a PSA unit for selective separation of nitrogen from $CO_2$. In the most beneficial applications of the invention, the high purity nitrogen obtained is mixed with the pure hydrogen stream simultaneously obtained by purifying the reformate from the hydrocarbon reforming operation to provide a suitable mixed charge for synthesis of ammonia. In a preferred embodiment, removal of $CO_2$ from the flue gas and from the crude hydrogen stream are carried out consecutively in the same bed of adsorbent.

DETAILED DESCRIPTION

Figure 1:
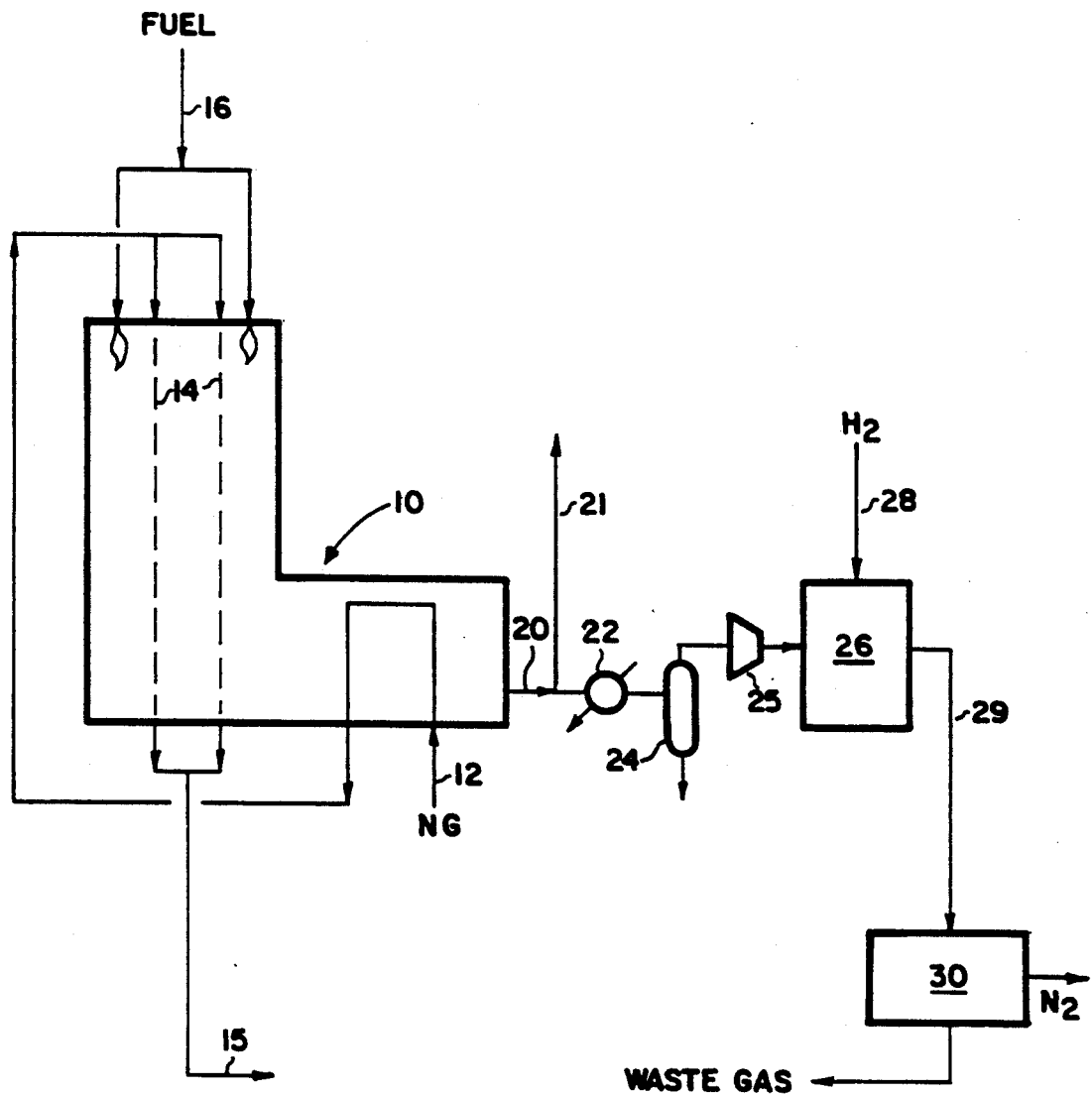
FIG. 1 is a schematic flow diagram of an operation in accordance with the invention for recovery of nitrogen from flue gas.

As illustrated in FIG. 1 of the accompanying drawings, the starting hydrocarbon feed, typically natural gas (NG), is introduced together with added steam into the convection section of a conventional steam reformer furnace 10 via line 12 and the thus heated stream (at about 1075° F.) is then passed through the catalyst packed tubes 14 provided in the radially heated section of the furnace. The reformate, discharged from the catalyst tubes through line 15, is sent to further treatment depending upon the ultimate product or products desired to be recovered.

Heat for the steam reforming in furnace 10 is provided by combustion in air of gaseous hydrocarbon fuel, which may be natural gas or other methane-rich hydrocarbon stream. The fuel is supplied via line 16 to burners located in the radiant section of the furnace, thereby heating the hydrocarbon charge passing through tubes 14.

By combustion of the fuel gas in air, a flue gas product is formed containing in the order of about 90% nitrogen. A typical flue gas composition comprises:

|  | mole % |
|---|---|
| $CO_2$ | 10 |
| Ar | 1 |
| $N_2$ | 88.5 |
| $O_2$ | 0.5 |
| $H_2O$ | saturated |

The obtained flue gas is discharged from furnace 10 through line 20, a portion of which may be by-passed or vented through line 21 if so desired. The remaining flue gas in line 20 is cooled at 22 and after removal of condensate at 24 is compressed at 25 to a pressure level of about ten atmospheres. The compressed gas is introduced into a catalytic hydrogenation reactor 26 for reaction of contained free oxygen with hydrogen (deoxygenation) supplied to the reactor via line 28. The effluent discharged from reactor 26 via line 29 is substantially free of oxygen and now comprises about: 89% nitrogen, 10% $CO_2$ and 1% argon. This gas composition is passed by line 29 into an adsorbent column of a system 30 having a bed of adsorbent selective for retention of $CO_2$. Among the typical adsorbents proposed for this purpose are: activated carbon, molecular sieve, alumina, and silica gel.

Any of the known PSA systems effective for $N_2/CO_2$ separation may be employed, having two or more adsorbent columns operated in parallel for alternating adsorption in and regeneration of the adsorbent beds. Pressure swing adsorption systems that can be preferably utilized in practice of the invention are more fully hereinafter described. Because of the high separation factor for $CO_2$ over $N_2$, high nitrogen recovery at a comparatively low power requirement per unit of nitrogen produced is made possible.

The deoxygenation of the flue gas may be performed by reaction of free oxygen with recycle hydrogen.

Figure 2:
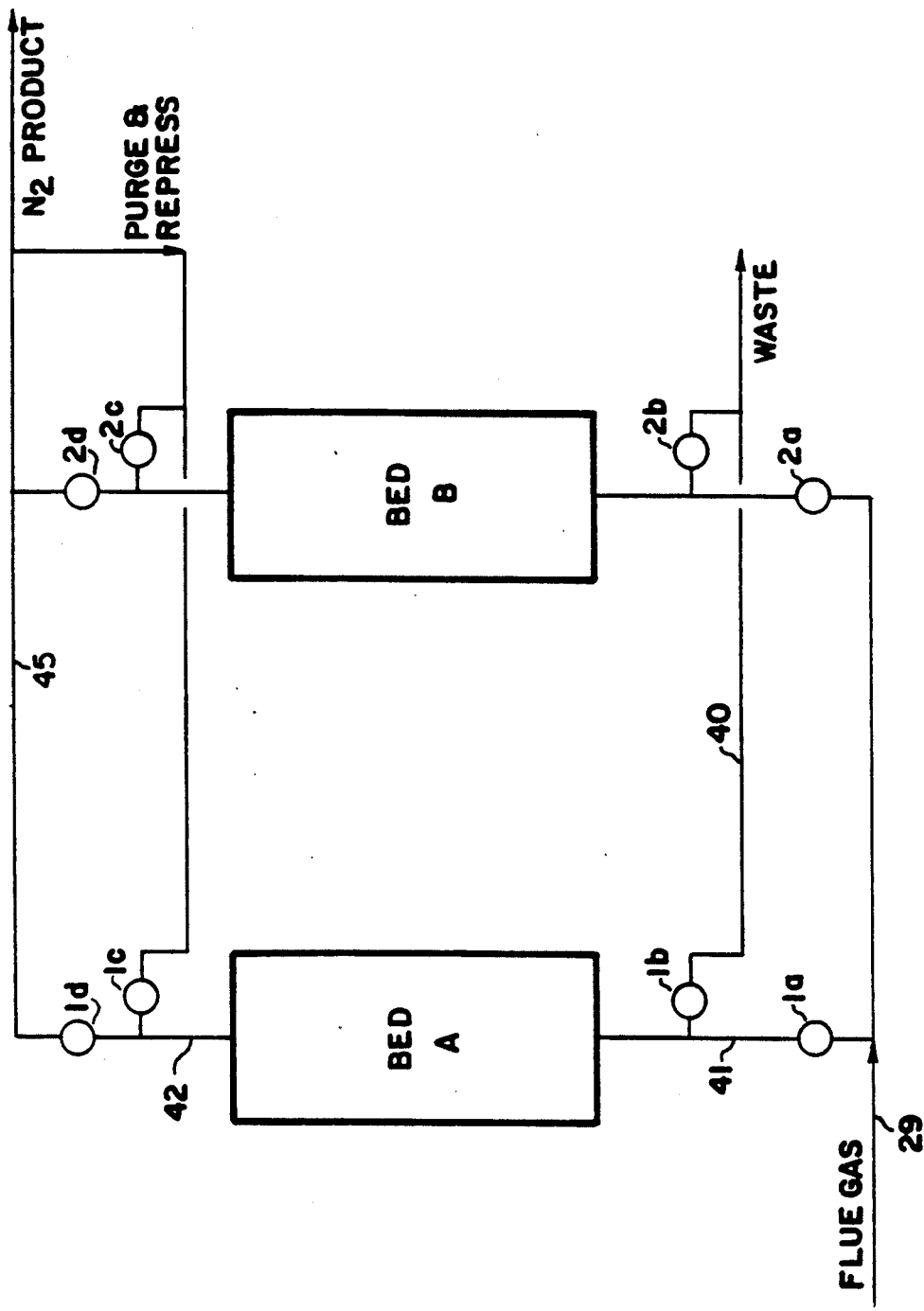
FIG. 2 is a simplified flow diagram of a two-column pressure swing adsorption system (PSA) utilized for recovery of high purity nitrogen from flue gas.

An advocated simple two column PSA system for nitrogen recovery from flue gas is illustrated in FIG. 2.

(1) The flue gas charge, such as that provided by line 29 of FIG. 1, is introduced at prevailing superatmospheric pressure (~100-200 psia) into a selected one of the two beds (say bed A) through open valve 1a in line 41 passing through the adsorbent bed to discharge the unsorbed nitrogen product into line 42 and thereby through open valve 1d into manifold 45. $CO_2$ is preferentially adsorbed in the bed as well as water and slight to trace amounts of nitrogen and argon.

(2) At the termination of the adsorption step the pressure in the A bed is reduced from the feed pressure to about 15 psia by venting the void gas and some of the adsorbed $CO_2$ into line 40 through open valve 1b as waste or for other desired treatment or use.

(3) Bed A is next purged in countercurrent flow direction with some of the product nitrogen withdrawn from the product in line 45 and introduced into the bed through open valve 1c. The remainder of the previously adsorbed $CO_2$ is thus removed and discharged into line 40 via open valve 1b.

(4) Bed A is next returned to the designed adsorption pressure level for repetition of the cycle by countercurrent introduction of nitrogen product gas through open valve 1c; valve 1b being closed.

Column B in turn goes through the same sequence of operating steps, valve 2a being opened two receive the charge gas as valve 1a is closed. The complete cycle for each of the two columns may be from 2 to 12 minutes.

Figure 4:
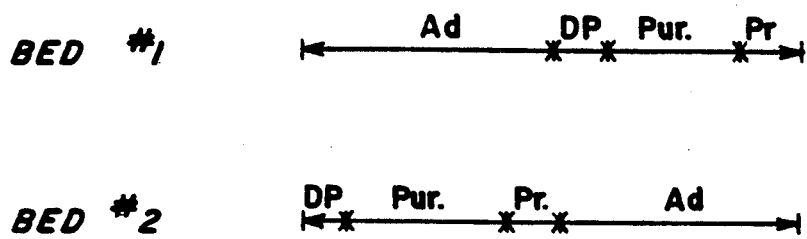
FIG. 4 is a step sequence cycle chart for operation of the FIG. 2 embodiment of the invention.

The valve position sequence for the two column cycle is set out in Table 1 below and a cycle diagram shown in FIG. 4.

TABLE 1

Valve Sequencing for the Two Bed Option

| Time Min | Bed 1 | Bed 2 | 1a | 1b | 1c | 1d | 2a | 2b | 2c | 2d |
|---|---|---|---|---|---|---|---|---|---|---|
| 1 | Ad | DP | O | C | C | O | C | O | C | C |
| 2 | Ad | P | O | C | C | O | C | O | O | C |
| 3 | Ad | PR | O | C | C | O | C | C | O | C |
| 4 | DP | Ad | C | O | C | C | O | C | C | O |
| 5 | P | Ad | C | O | O | C | O | C | C | O |
| 6 | PR | Ad | C | C | O | C | O | C | C | o |

Figure 3:
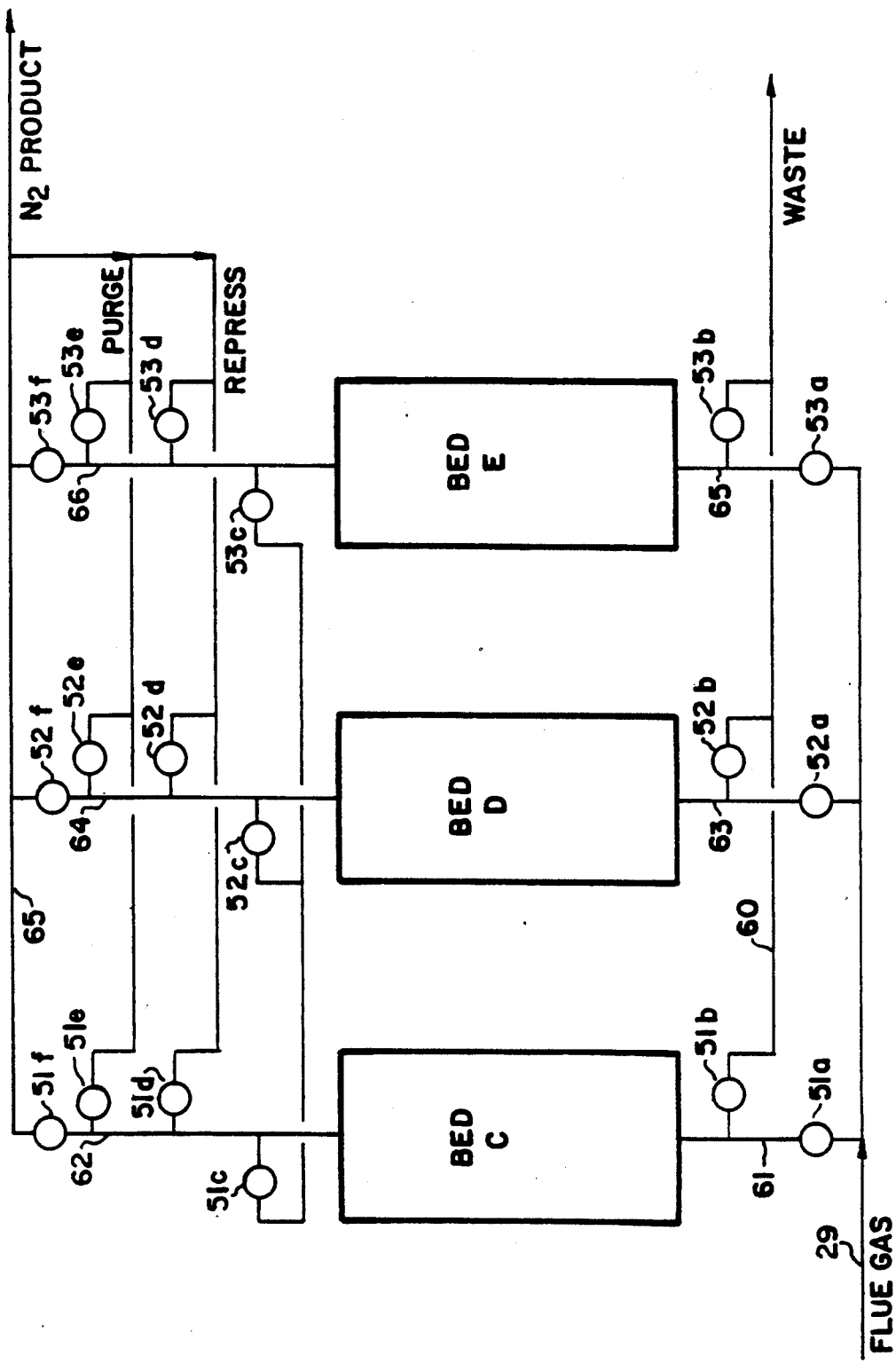
FIG. 3 is a flow diagram of an alternative PSA system for purification of nitrogen employing three adsorption columns.

Ad — Adsorption
DP — Depressurization
P — Purge
PR — Pressurization
O — Open Valve
C — Closed Valve A three column alternative embodiment of a PSA system for CO$_2$ removal is illustrated in FIG. 3. In this embodiment the adsorption columns are labeled C, D and E and undergo the following sequence of steps during the operating cycle:

(1) Flue gas from supply line 29 is passed through previously regenerated Bed C at designed superatmospheric pressure (about 100 to 200 psia) via open valve 51a. During such passage CO$_2$ and other contaminants are adsorbed in the bed while unsorbed nitrogen is discharged as product into line 65 through open valve 51f.

(2) Bed C is connected in gas flow communication with Bed E (which has just been purged and is then at a pressure of about 1 atmosphere). Flow from Bed C to Bed E is through open valves 51c (in line 62) and 53c in line 66, and is continued until substantially equal pressure level is attained in these columns. Some of the void and adsorbed nitrogen is recovered in this step thereby improving the overall nitrogen recovery, as opposed to the previously described two bed process in which this nitrogen is vented during the desorption step.

(3) Bed C next is desorbed by countercurrent gas withdrawal through open valve 51b in line 60. Some of the previously adsorbed CO$_2$ is thus rejected as waste or subjected to further treatment for a designed use.

(4) Bed C is next purged with product nitrogen admitted through open valve 51e, the purge products being discharged into line 60 through open valve 51b. During this step the remainder of the CO$_2$ is desorbed and discharged.

(5) Bed C is then connected to Bed D for gas flow therebetween out of open valve 52c and into Bed C through open valve 51c until pressure equalization is had.

(6) Finally, Bed C is repressured to design adsorption pressure level with product nitrogen admitted through line 62 and open valve 51d and thus made ready for repetition of the describe cycle.

Figure 5:
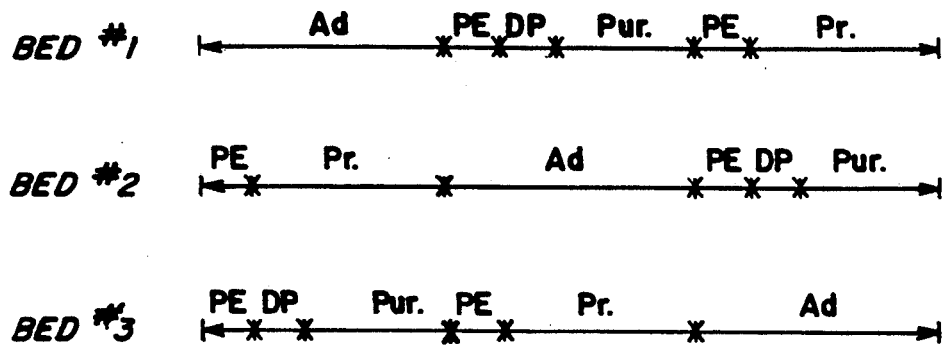
FIG. 5 is a step sequence cycle chart for operation of the FIG. 3 embodiment.

Each of the three columns (C, D and E) in turn follows the recited sequence. The valve sequences for the cycle during an optional 9 minute period are given in Table 2 and a cycle diagram for this embodiment is shown in FIG. 5. Other total cycle times can be employed with the duration of the time intervals for the individual steps divided substantially as indicated in FIG. 5.

TABLE 2

Valve Sequencing for the Three Bed Option

| Time Min | 1 | 2 | 3 | 4 | 5 | 6 | 7 | 8 | 9 |
|---|---|---|---|---|---|---|---|---|---|
| Bed C | Ad | Ad | Ad | PE | DP | P | PE | PR | PR |
| Bed D | PE | PR | PR | Ad | Ad | Ad | PE | DP | P |
| Bed E | PE | DP | P | PE | PR | PR | Ad | Ad | Ad |
| Valve Position | | | | | | | | | |
| 51a | O | O | O | C | C | C | C | C | C |
| 51b | C | C | C | C | O | O | C | C | C |
| 51c | C | C | C | O | C | C | O | C | C |
| 51d | C | C | C | C | C | C | C | O | O |
| 51e | C | C | C | C | C | O | C | C | C |
| 51f | O | O | O | C | C | C | C | C | C |
| 52a | C | C | C | O | O | O | C | C | C |
| 52b | C | C | C | C | C | C | C | O | O |
| 52c | O | C | C | C | C | C | O | C | C |
| 52d | C | O | O | C | C | C | C | C | C |
| 52e | C | C | C | C | C | C | C | C | O |
| 52f | C | C | C | O | O | O | C | C | C |
| 53a | C | C | C | C | C | C | O | O | O |
| 53b | C | O | O | C | C | C | C | C | C |
| 53c | O | C | C | O | C | C | C | C | C |
| 53d | C | C | C | C | O | O | C | C | C |
| 53e | C | C | O | C | C | C | C | C | C |
| 53f | C | C | C | C | C | C | O | O | O |

Ad — Adsorption
PE — Pressure Equalization
DP — Depressurization
P — Purge
PR — Pressurization While higher N$_2$ recovery is obtained with the described three bed embodiment of FIG. 3, this advantage is to be balanced against the cost of the extra valves, headers, and extra column required for this option.

The two bed and three bed embodiments are compared in Table 3 for the production of 4MMSCFD nitrogen plug argon (99.99%) from a flue gas comprised of 89% N$_2$, 10% CO$_2$ and 1% argon (water-free basis). The PSA unit in each instance is operated at a designed adsorption pressure of 10 atmospheres and at ambient temperature of 20° C. The adsorbent employed is sodium Y molecular sieve zeolite (Linde NaY) in 1/16 inch pellets.

TABLE 3

| | FIG. 3 Process | FIG. 2 Process |
|---|---|---|
| Weight of Adsorbent (lbm/bed) | 3340 | 3600 |
| Time of Adsorption (min) | 4 | 4 |
| Feed flow (lb mole/hr) | 600 | 645 |
| N$_2$ recovery (%) | 80 | 74 |

The beneficial advantages in operation in accordance with the present invention are obtained in large measure because of the high separation factor of CO$_2$ over N$_2$ on molecular sieve adsorbents as compared to that encountered in O$_2$/N$_2$ separation from atmospheric air by pressure swing methods in which vacuum desorption (VSA) is commonly relied upon. As a result, the present invention achieves higher nitrogen recovery. In operations aimed at ultimate production of ammonia the higher compression power employed in the CO$_2$/N$_2$ separation of the invention is not a disadvantage, because the product nitrogen needs to be compressed to the operating pressure of the ammonia conversion system (>150 psia). In practice of the present invention the nitrogen is produced at about 150 psia as compared to production of nitrogen from air by cryogenic fractionation or by pressure swing including a vacuum desorption step, in which latter instances the product nitrogen is generally obtained at about 20 psia and needs to be further compressed to the ammonia conversion operating pressure.

The production of nitrogen from available flue gas by PSA is less expensive than that employing VSA in nitrogen separation from atmospheric air, in the short capacity range of the latter of 30–80 MSCFH. Also, recovery of nitrogen from flue gas by PSA is significantly cheaper than cryogenic nitrogen separation, at least up to a nitrogen production plant capacity of 6 MMSCFD.

The amount of nitrogen available for recovery from flue gas depends upon the furnace characteristics. In a typical SMR plant the nitrogen content of the flue gas is approximately 1.5 to 2.0 times the amount of $H_2+CO$ syngas as generated in the reforming operation (CO yielding additional hydrogen in the subsequent water gas shift reaction). Therefore, assuming that an 80% nitrogen recovery is had, about 0.5 to 6 MMSCFD of $N_2$ (economical range for this process) can be generated from a plant sized to produce 0.4 to 9 MMSCFD of hydrogen plus CO. Since the average capacity of such a plant is about 10–15 MMSCFD, the economic capacity range for the process of the present invention is easily covered.

In addition to providing a method applicable generally for production of nitrogen at cost lower than that had by either of the established technologies, further and even greater advantages are obtained in systems wherein the production of hydrogen from flue gas is utilized in an installation for production of $NH_3$ syngas in which a secondary reformer of the heat exchanger type is used in combination with an SMR fuel-fired reformer furnace, as hereinafter described.

Figure 7:
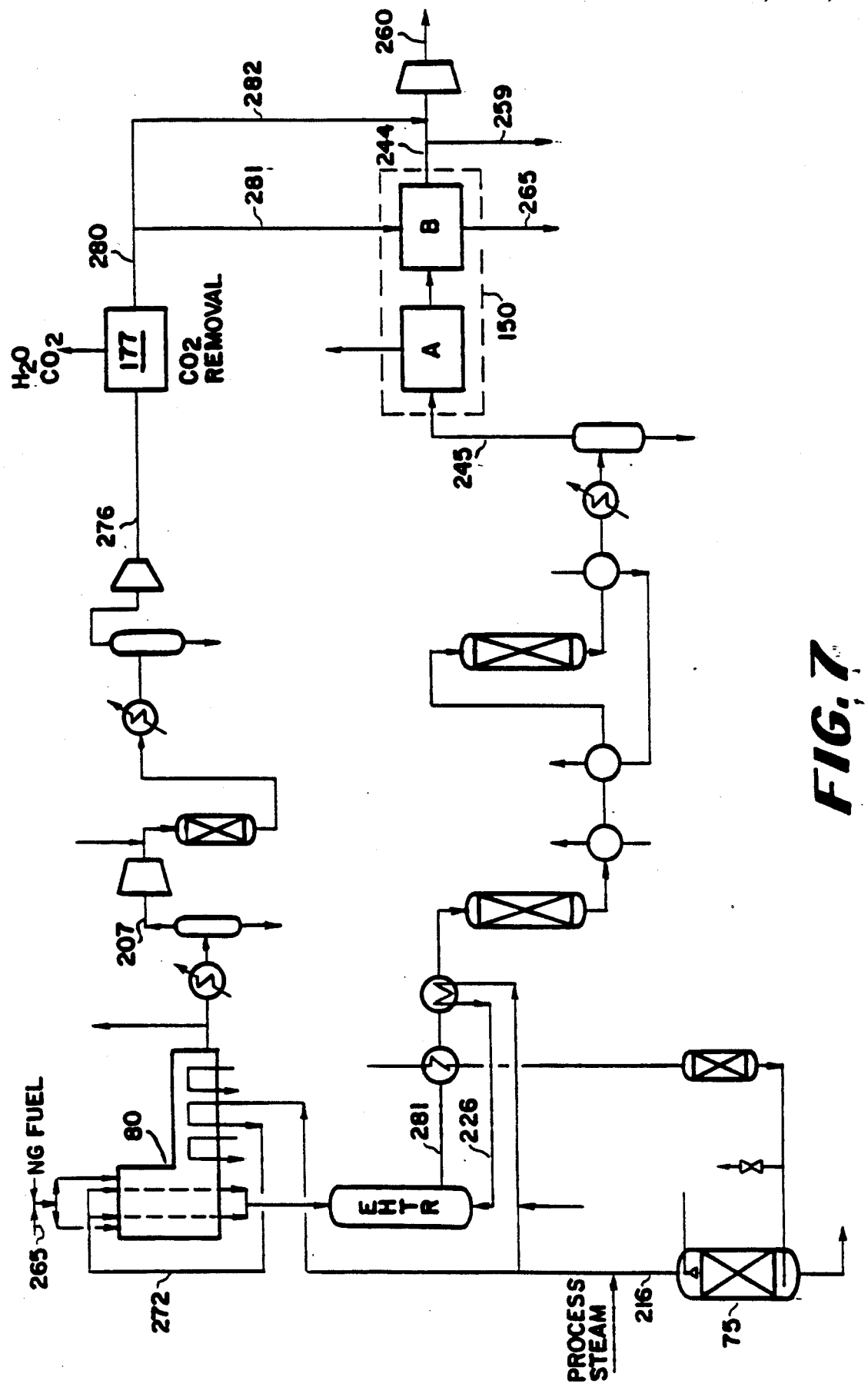
Figure 8:
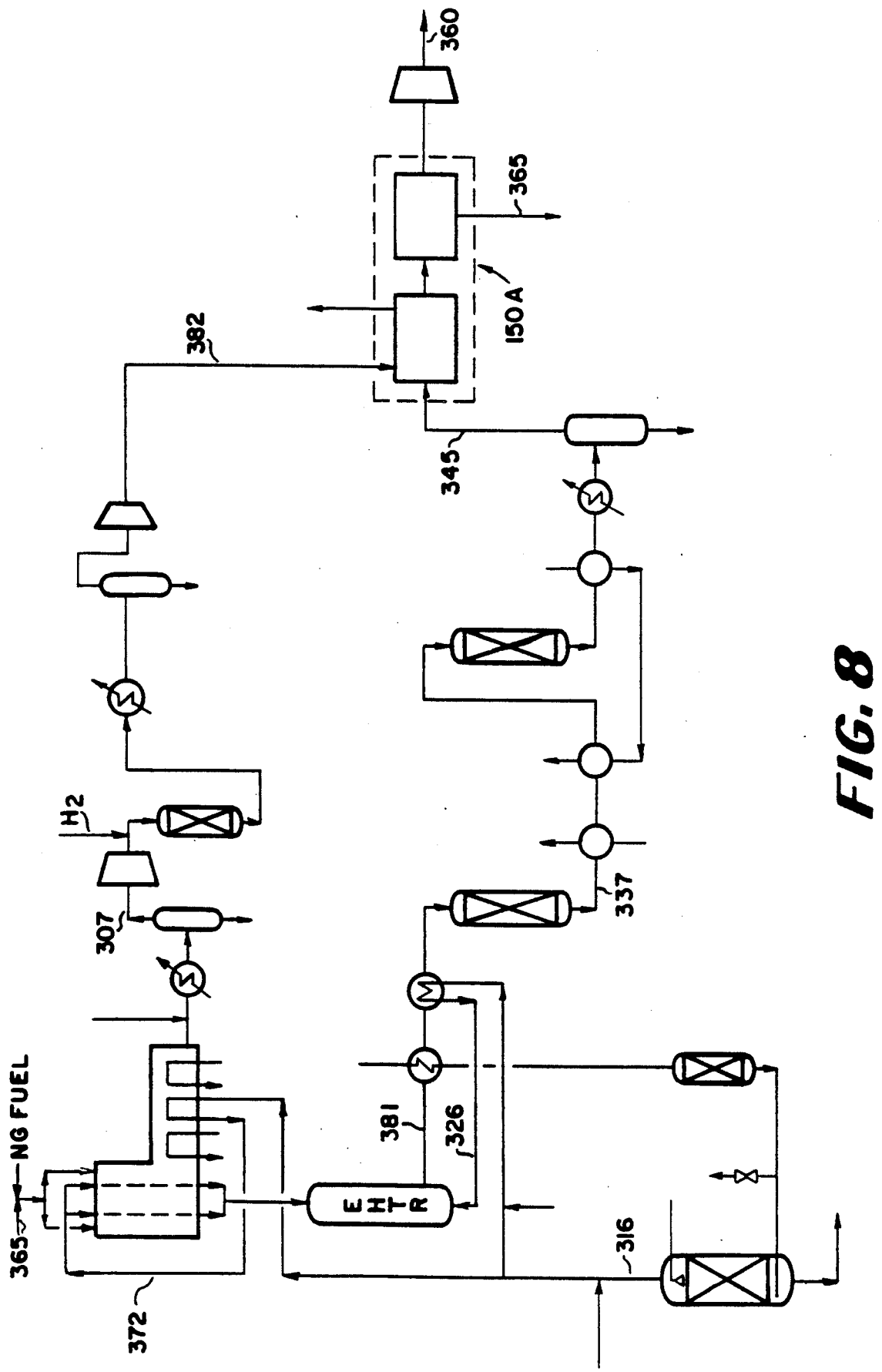

As hereinabove indicated the present invention is of special advantage in integrated systems for preparation of ammonia synthesis gas by methods involving steam reforming of hydrocarbons. In the preferred practice of the present invention the hydrocarbon reforming operation is carried out in two stages: the first stage being performed in a conventional fuel-fired steam reforming furnace to which a major portion of the fresh methane-rich feed is charged. The hot effluent from this first reforming stage is employed as the heating medium to support reforming of the remaining minor portion of the fresh feed by indirect and direct heat exchange therewith and the combined reformates are subjected to CO-shift conversion before undergoing $CO_2$ removal and further purification by PSA. Examples of such integrated system in several embodiments are illustrated in FIGS. 6, 7 and 8 of the accompanying drawings.

Figure 6:
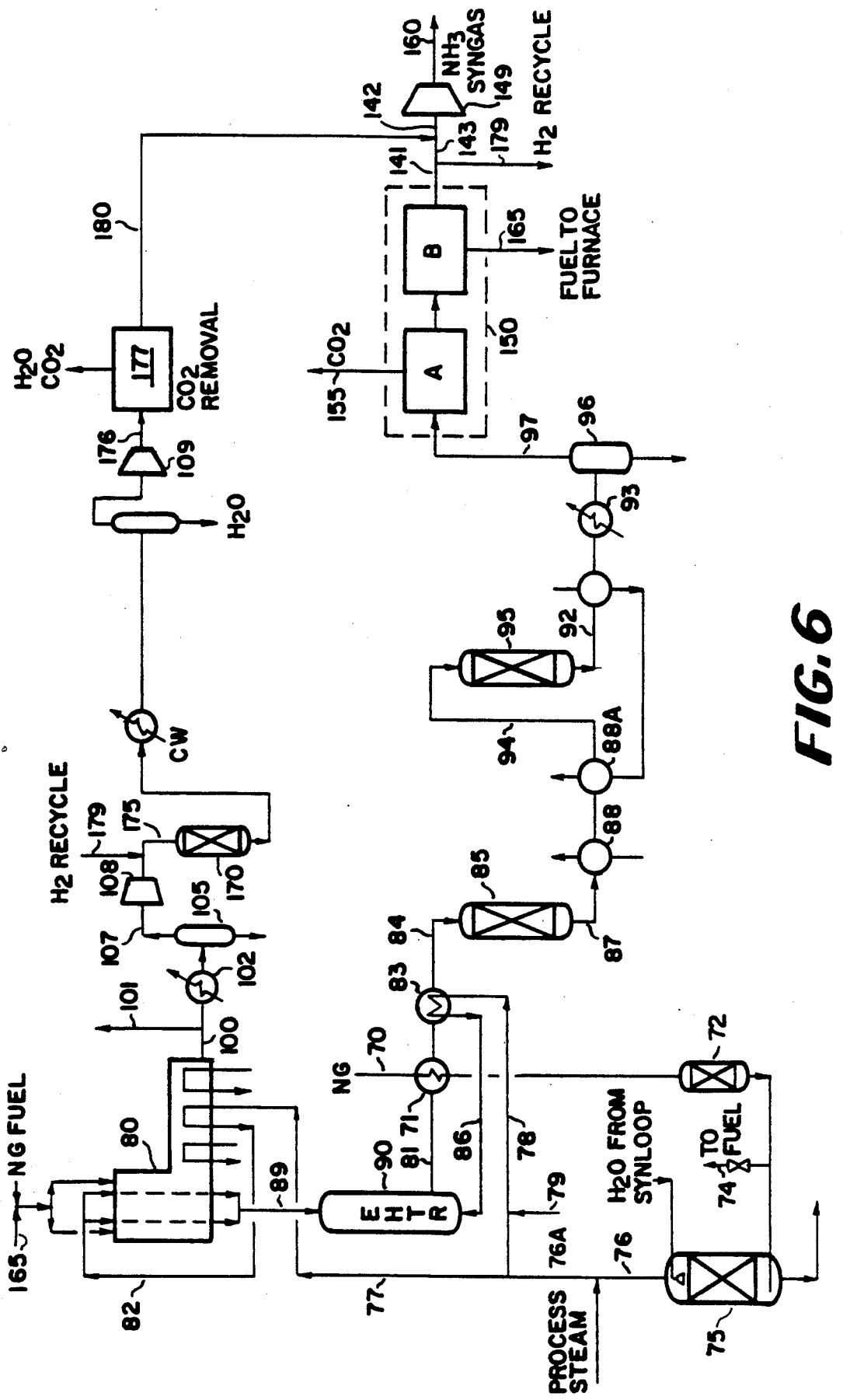
FIGS. 6, 7 and 8 are alternative process flow diagrams of integrated operations for production of $NH_3$ syngas utilizing flue gas as the source of the nitrogen, and hydrocarbon reforming for the production of utilized hydrogen.

As illustrated in FIG. 6 of the accompanying drawings, the natural gas (NG) or other methane-rich hydrocarbon feed in line 70 is preheated by exchange with reformer effluent at 71 and desulfurized in known manner at 72, such as by treatment in a zinc oxide bed. A portion of the desulfurized gas is withdrawn via line 74 for use as fuel in primary steam reformer furnace 80. The remainder is saturated with water at 75 (acquiring a 1.7 S/C ratio) at line 76 and then mixed with steam (at 420 psia) to obtain in feed line 76A a 3.5 steam/carbon ratio.

A major portion of the steam-hydrocarbon mixture of line 76A (preferably about 70%) is passed via line 77 into the convection section of reformer furnace 80 where it is heated to about 1075° F. before admission into the catalyst tubes of the radiantly heated section of furnace 80 via line 82. The remaining minor portion is withdrawn from line 76A via line 78 and the steam to carbon (S/C) ratio therein increased to 6.0 by steam addition at 79, and after being preheated by exchange at 83 is introduced into the Enhanced Heat Transfer Reformer (EHTR) reformer 90 via line 86. The steam reforming in 80 is carried out at about 1600° F. while the reforming of the minor portion of the fresh hydrocarbon charge in 90 is performed at about 1365° F.

In the radiantly heated section of furnace 80 the preheated stream admitted by line 82 is passed through the catalyst-filled tubes and the reformed product is discharged by line 89 into EHTR reformer 90, wherein the heat content of this reformate is utilized for providing the heat required for reforming the raw gas introduced into the reformer via line 86 as is hereinafter more fully described.

The flue gas generated in SMR furnace 80 passes through the convection section of the furnace where it is cooled to about 300° F. and is discharged from the furnace by line 100, a predetermined portion being vented as indicated at 101. After further cooling at 102 the condensed water is removed in phase separator 105 and the vapor overhead 107 is compressed in 108 to about 160 psig before being mixed with a hydrogen recycle stream 179. This mixture (stream 175) then enters a DEOXO reactor 170 where excess $O_2$ in the flue gas is reacted in known manner with the hydrogen to form water. The product stream from reactor 170 is then further cooled and condensed water separated out, compressed in 109 to 275 psig, and the product admitted via line 176 to a PSA unit 177 for removal of contained $CO_2$ and residual water. From the PSA unit 177 a pure nitrogen product is recovered as the unadsorbed effluent in line 180, which is mixed with the purified hydrogen stream 143 recovered from PSA unit 150. A portion of stream 141 is utilized, via line 179, to supply hydrogen to the DEOXO reactor 170, the remainder (line 143) being mixed with the pure nitrogen from line 180 to form the ammonia syngas ($N_2+H_2$) of line 142 which is compressed at 149 to the pressure required in the ammonia synthesis process and sent to the ammonia synthesis recycle loop via line 160.

For the removal of $CO_2$ from the crude nitrogen stream at 177 one may employ a PSA system such as heretofore described and illustrated in FIGS. 2 and 3 of the drawings, or any other known system effective in $N_2/CO_2$ separation.

The syngas discharged from EHTR reformer 90 via line 81 passes in heat exchange at 71 and 83, where it is cooled to suitable temperature for the shift conversion reaction. Thus, for the designed successive staged temperature shift reactions as illustrated, the crude syngas is introduced by line 84 into the High Temperature Shift (HTS) reactor 85 at about 740° F. The shift reaction product is discharged from HTS via line 87 and after being cooled at 88 and 88A to about 400° F., is charged to the Low Temperature Shift (LTS) converter 95 via line 94. By the heat transfer at 88 and 88A respectively 1500 psia steam is generated and boiler feed water (BFW) is preheated. The shifted product from the the LTS bed is discharged via line 92 and, after being cooled to 100° F. at 93 with condensate removal at 96, is sent to the PSA system 150 by line 97 for hydrogen separation and purification.

The PSA system 150 in the embodiment illustrated in FIGS. 6 and 7 comprises two groups of beds designated A beds and B beds, the A beds containing particulate solid adsorbent selective in adsorptive retention of water and $CO_2$ and the B beds containing adsorbent effective in retention of minor impurities, such as $CH_4$ and CO, present in the $CO_2$-freed hydrogen-rich stream, permitting recovery of unsorbed hydrogen in essentially pure state.

Multibed PSA systems having two distinct groups of adsorbent beds arranged for successive adsorptive removal of one or more components from a mixture of gases are known in the art, as shown for example in U.S. Pat. No. 4,171,206 assigned to applicants' assignee. As taught in the cited '206 patent, the starting gas mixture to be separated is charged to a selected adsorbent bed of the first group (A) at superatmospheric pressure; $CO_2$ is sorbed in the bed while the unsorbed gas effluent passes into an adsorbent bed of the second group (B) for sorptive removal of the minor contaminants. Regeneration of the $CO_2$-laden bed is effected by pressure reduction to about ambient pressure level and subsequent evacuation to about 50 to 250 mmHg; the desorbed $CO_2$ may be recovered or vented to the atmosphere as indicated at 155. The separate regeneration of the impurity-laden second bed is effected by pressure reduction and purge, the purge gas being a portion of the product; desorbed products are discharged as indicated at 165 and the discharged effluent is employed for fuel in furnace 80. The flowrates and compositions of selected key streams for the embodiment illustrated in FIG. 6 of the present drawings, are given in Table 4 below.

of the key streams and flowrates are reported in Table 5. Like elements in FIGS. 7 and 8 are numbered similarly to those in FIG. 6.

As shown in FIG. 7, the nitrogen stream 280 is split into two portions 281 and 282. The 281 stream is utilized as a purge gas for removal of sorbed $CH_4$ and CO from the B beds of the PSA system 150, while the 282 stream is combined with the purified hydrogen product effluent discharged from the B beds via line 244. As will be seen from a comparison of Tables 4 and 5, stream 280 (FIG. 7) has approximately the same composition as stream 180 (FIG. 6); while stream 141 (FIG. 6) is composed of essentially pure $H_2$, corresponding stream 244 in the FIG. 7 embodiment contains in addition to hydrogen, nitrogen and part of the argon derived from the purge gas employed in regeneration of the B beds. The purge product discharged via line 265 is cycled for use as fuel in furnace 80.

In operation of the FIG. 7 embodiment 30% more nitrogen is needed than that employed in the FIG. 6 embodiment to provide the extra nitrogen needed for purging the B bed of the PSA system. However, because of the nitrogen being used as a purge gas, a higher recovery of hydrogen can be obtained in the PSA system. The composition of key streams in the FIG. 7 embodiment are shown in Table 5.

TABLE 5

Selected Flowrates, Pressures, and Temperatures Corresponding to Stream Numbers in FIG. 7

| Components (# moles/hr) | Stream Number | | | | | | | | | | |
|---|---|---|---|---|---|---|---|---|---|---|---|
| | 216 | 272 | 281 | 245 | 244 | 260 | 265 | 226 | 207 | 276 | 280 |
| Methane | 2365.9 | 1679.8 | 388.7 | 388.6 | — | — | 388.6 | 686.1 | — | — | — |
| Hydrogen | — | — | 6848.2 | 7878.0 | 7499.9 | 7408.4 | 378.1 | — | — | — | — |
| Carbon Monoxide | — | — | 1060.9 | 30.5 | — | — | 30.5 | — | — | — | — |
| Carbon Dioxide | — | — | 916.3 | 1937.1 | — | — | — | — | 472.8 | 472.8 | — |
| Oxygen | — | — | — | — | — | — | — | — | 103.9 | — | — |
| Nitrogen | — | — | — | — | 899.1 | 2986.0 | 899.0 | — | 4859.1 | 4870.0 | 3896.0 |
| Water | 4066.6 | 5879.3 | 7101.2 | 38.5 | — | — | — | 4115.5 | 381.7 | 36.9 | — |
| Argon | — | — | — | — | 11.5 | 38.3 | 11.5 | — | 62.3 | 62.4 | 49.9 |
| Total Flow | 6432.5 | 7559.1 | 16315.3 | 10272.7 | 8410.5 | 10432.7 | 1719.3 | 4801.6 | 5879.9 | 5454.6 | 3945.9 |
| Pressure (psia) | 346 | 340 | 310 | 270 | 260 | 1200 | 20 | 340 | 15 | 275 | 260 |
| Temperature (F.) | 386 | 1075 | 980 | 100 | 100 | 100 | 100 | 700 | 100 | 100 | 100 |

In the FIG. 8 embodiment a single integrated PSA system 150A is employed for treatment of the flue gas to

TABLE 4

Selected Flowrates, Pressures, and Temperatures Corresponding to Stream Numbers in FIG. 6

| Components (# moles/hr) | Stream Number | | | | | | | | | | |
|---|---|---|---|---|---|---|---|---|---|---|---|
| | 76 | 82 | 81 | 97 | 141 | 160 | 165 | 86 | 107 | 176 | 180 |
| Methane | 2669.2 | 1895.1 | 438.5 | 438.4 | — | — | 438.4 | 774.1 | — | — | — |
| Hydrogen | — | — | 7725.9 | 8887.1 | 7500.8 | 7408.7 | 1386.5 | — | — | 0.4 | — |
| Carbon Monoxide | — | — | 1196.9 | 35.0 | — | — | 34.3 | — | — | — | — |
| Carbon Dioxide | — | — | 1033.8 | 2184.8 | — | — | — | — | 283.5 | 283.5 | — |
| Oxygen | — | — | — | — | — | — | — | — | 91.7 | — | — |
| Nitrogen | — | — | — | — | — | 2996.3 | — | — | 3745.4 | 3745.3 | 2996.3 |
| Water | 4588.5 | 6632.9 | 8011.0 | 43.7 | — | — | — | 4642.8 | 289.3 | 27.7 | — |
| Argon | — | — | — | — | — | 38.4 | — | — | 48.0 | 48.0 | 38.4 |
| Total Flow | 7257.7 | 8528.0 | 18406.3 | 11589.0 | 7500.8 | 10443.4 | 1859.2 | 5416.9 | 4457.9 | 4104.9 | 3034.7 |
| Pressure (psia) | 346 | 340 | 310 | 270 | 260 | 1200 | 20 | 340 | 15 | 275 | 260 |
| Temperature (F.) | 386 | 1075 | 980 | 100 | 100 | 100 | 110 | 700 | 100 | 100 | 100 |

The embodiment of the invention illustrated in FIG. 7 differs from that of FIG. 6 in several respects, particularly in the handling of the nitrogen stream 180 (FIG. 6) obtained from the furnace flue gas, and in the regeneration of the B beds in PSA system 150. The composition recover nitrogen and to treat the reformate for recovery and purification of the contained hydrogen.

The composition of the key streams and flow rates for the FIG. 8 embodiment are reported in Table 6.

TABLE 6

Selected Flowrates, Pressures, and Temperatures Corresponding to Stream Numbers in FIG. 8

| Components | Stream Number | | | | | | | | | |
|---|---|---|---|---|---|---|---|---|---|---|
| (# moles/hr) | 316 | 372 | 381 | 337 | 345 | 360 | 365 | 326 | 307 | 382 |
| Methane | 3177.4 | 2255.9 | 521.9 | 521.9 | 521.9 | — | 521.9 | 921.4 | — | — |
| Hydrogen | — | — | 9196.8 | 10188.3 | 10579.9 | 7409.7 | 3074.9 | — | — | — |
| Carbon Monoxide | — | — | 1424.8 | 433.3 | 41.0 | — | 41.0 | — | — | — |
| Carbon Dioxide | — | — | 1230.6 | 2222.1 | 2601.4 | — | 0.0 | — | 577.8 | 577.7 |
| Nitrogen | — | — | — | — | — | 3015.2 | 1076.3 | — | 5320.8 | 5376.3 |
| Water | 5462.3 | 7895.7 | 9536.6 | 8545.1 | 51.5 | — | — | 5526.9 | 422.5 | 41.2 |
| Argon | — | — | — | — | — | 38.6 | 13.8 | — | 68.2 | 68.9 |
| Oxygen | — | — | — | — | — | — | — | — | 118.3 | — |
| Total Flow | 8639.6 | 10151.6 | 21910.8 | 21910.8 | 13795.6 | 10463.5 | 4727.9 | 6448.3 | 6507.5 | 6087.3 |
| Pressure (psia) | 346 | 340 | 310 | 295 | 270 | 1200 | 20 | 340 | 15 | 275 |
| Temperature (F.) | 386 | 1075 | 980 | 832 | 100 | 100 | 110 | 700 | 100 | 100 |

An important feature of a preferred embodiment of the present invention contributing to the obtained economic advantages including savings in fuel costs, resides in the arrangement wherein the heat of a conventional steam reforming reaction is utilized to provide the heat requirement for a second parallel stage of reformation. A preferred design for a reforming furnace useful for practice of the second parallel stage reforming is illustrated in FIG. 9.

Figure 9:
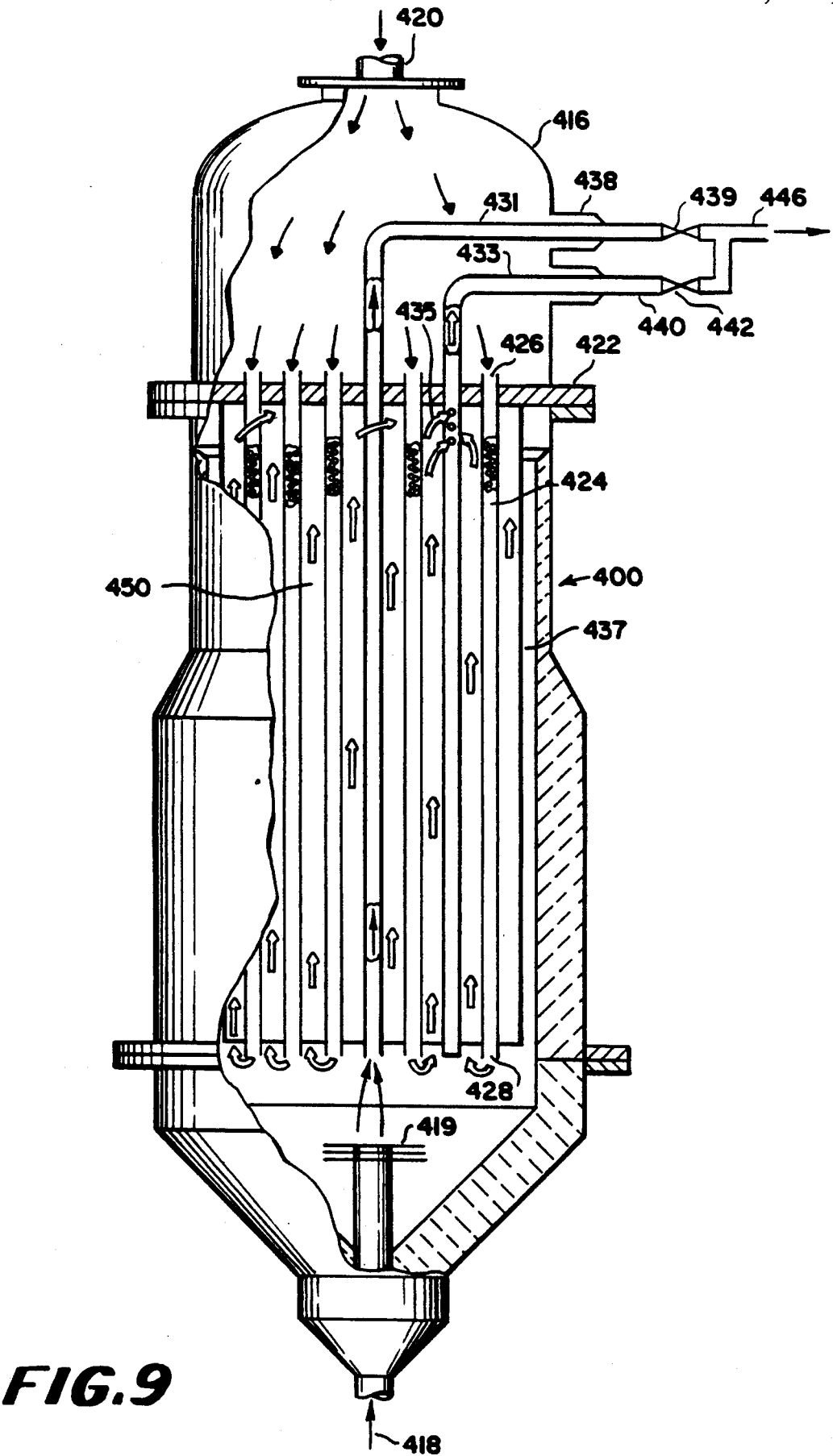
FIG. 9 is a front view of a secondary reforming reactor, portions of the outer wall being broken away to display internal structure.

As shown in FIG. 9, a generally elongated cylindrical reactor 400 is provided to house a discrete array of reaction tubes 424 held in the shell of reactor 400 by a tube sheet or plate 422 situated at the upper end 416 of the reactor. The tube sheet or plate 422 completely closes off the end 416 of the reactor except for the inlet ends 426 of the reaction tubes 424. The interior of reactor 400 is preferably lined with castable refractory insulation. In practice of the present invention the preheated mixture of natural gas and steam from line 86 (FIG. 6) is introduced into the inlet 420 of the reactor. The primary reformate from line 89 (FIG. 6), which is to serve as the heating medium, is introduced at the opposite end of the reactor through inlet 418 and diffuser plate 419, and is distributed by the plate within the shell side 450 constituting the reaction zone. Of course, the arrangement of the inlets 418 and 420 may be reversed so that the raw gas enters the bottom of the reactor 400 and the heating medium from line 89 (FIG. 6) is introduced into the shell side from the top of the reactor (as seen in FIG. 6). Also, other known forms of gas distribution in the shell area may be employed instead of plate 419 and shroud 437, such as a perforated plate, packing material or suitably arranged baffles.

For improving heat exchange between the heating medium and the raw gas feed, the exterior surfaces of tubes 424 may be provided with fins (not shown) arranged horizontally, vertically or wound thereon in spiral fashion.

The tubes 424 are packed with known steam reforming catalyst such as supported nickel. The mixture of natural gas and steam introduced at inlet 420 enters into the plenum area of the reactor and passes through the catalyst-containing tubes 424 at their inlets 426 through the perforated plates (not shown) fitted at the ends thereof.

In passing through the catalyst in tubes 424 the reactants (methane and steam) are heated to reformation temperature in the range of 1300° to 1400° F. by heat exchange against the hot reformate discharged at the exit end of tubes 424 as well as against the hot reformed product from line 89 (FIG. 6) introduced through inlet 418. The reformate is discharged from the outlet ends 428 of reaction tubes 424 which are fitted with perforated end plates (not shown) to retain the catalyst in the tubes.

The reformed product discharged from tubes 424 is blended with that introduced through inlet 418 and pass together longitudinally up along the external surfaces of the reaction tubes, thereby providing by indirect exchange the heat required for the catalytic reforming reaction taking place within the tubes. The combined products enter one or more discharge tubes 433 through perforations 435 provided therein and are discharged at the main product outlet 440 under control of valve 442. A portion of the combined products may be bypassed in tube 431 to control temperature. The bypassed product is discharged from tube 431 through outlet 438 under control of valve 439. The product passing through valve 439 may be combined with the main product passing through valve 442 and the combined products discharged via line 446.

By use of a heat exchange reforming furnace, of the type illustrated in FIG. 9, in conjunction with a conventional steam reforming furnace, increased efficiency is achieved by reduction in the amount of fuel needed to provide the heat for reforming.

While practice of the invention is not limited to any particular PSA system for purification of the flue gas stream for recovery of nitrogen and/or for purification of the reformate to produce essentially pure hydrogen, a preferred system, believed to obtain highest economic efficiency for reformate purifications is that having an arrangement such as already described above. Such system comprises a first set of adsorption columns (A beds) operated consecutively in timed sequence in parallel for removal of $CO_2$, and a separate second set of adsorption columns (B beds) for purification of the $CO_2$-freed gas product for removal of most of the remaining unsorbed contaminants in the product passed through the first set of columns (A beds). Such an arrangement of a PSA system is shown, for example, in above-cited U.S. Pat. No. 4,171,206, but operated in a modified manner from that of the patent to obtain the greatest advantage in separation of the components and in further purification of the particular gas stream compositions here involved.

As applied to the embodiments of the invention illustrated in FIGS. 6 and 7, the flue gas stream, after removal of free oxygen therefrom at 170 and removal of part of the contained water by condensation, is subjected to treatment for removal of contained $CO_2$. The flue gas at this point (line 176 in FIG. 6 or 276 in FIG. 7) is comprised of over 90% nitrogen about 7% $CO_2$. Removal of the $CO_2$ by selective pressure swing adsorption (at 177) will also remove contained residual water with resulting discharge from the PSA system of an essentially pure nitrogen product (line 180 in FIG. 6 or 280 in FIG. 7) containing no more than 1-2% argon. Thus, for $CO_2$ removal from the flue gas at 177 any simple known PSA system may be employed, such as one having two or more columns containing adsorbent selective for $CO_2$ retention, operated alternately for adsorption of $CO_2$ and subsequent desorption of the $CO_2$-laden adsorbent by countercurrent pressure reduction followed by purge with a portion of the nitrogen product.

The treatment of the flue gas in the embodiment illustrated in FIG. 6 follows the same mode as that described for the FIG. 7 embodiment. In the FIG. 7 embodiment, however, as heretofore described, the nitrogen stream (280) discharged from PSA system 177 is split, one portion (line 281) being employed as purge gas in the B-beds of PSA system 150.

In operation of the FIG. 7 embodiment, the preferred adsorbent for $CO_2$ removal from flue gas in unit 177 as well as in the A beds of PSA unit 150 is molecular sieve zeolite and the preferred adsorbent for hydrogen purification in the B-beds of PSA unit 150, is activated carbon and 5A molecular sieve in admixture or in separate layers.

It will be noted that the ammonia synthesis gas sent to the ammonia synthesis recycle loop via line 260 still contains a small amount of unremoved argon. To avoid buildup of argon in the ammonia recycle loop a slip stream is removed from the recycle, as is well known in the art.

Figure 10:
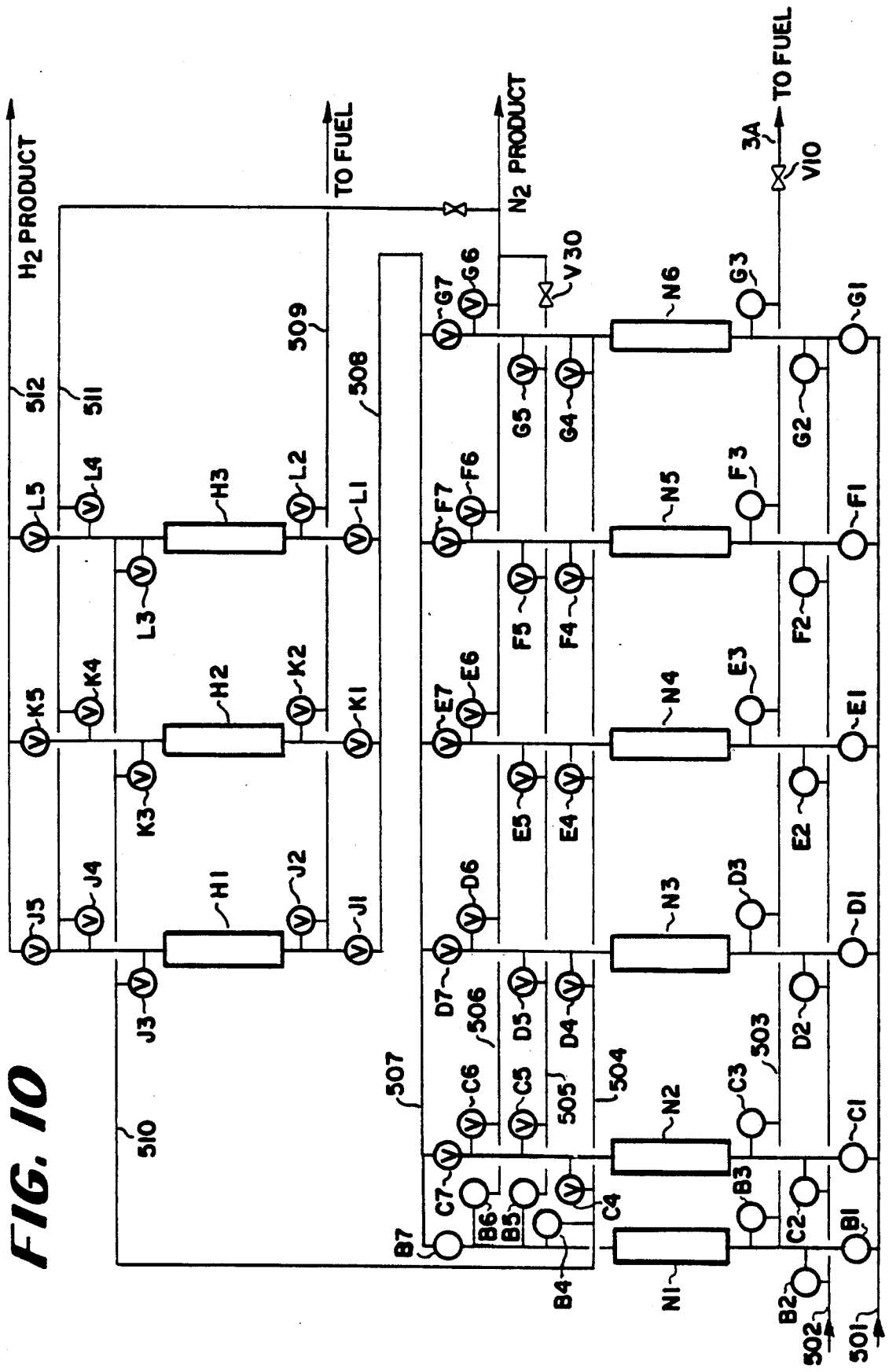
FIG. 10 is a schematic flow diagram of a preferred integrated PSA system for use in recovery of hydrogen and nitrogen in accordance with the invention.

In the FIG. 8 embodiment, a single integrated PSA system is employed for treatment of the flue gas to recover nitrogen and to treat the reformate for recovery and purification of the contained hydrogen. Flue gas containing 85-90% $N_2$ and the remainder being chiefly $CO_2$ with some $H_2O$, is passed to the first section of the PSA unit comprised of 6 adsorbent beds (as illustrated in FIG. 10), designated as the N-Beds. $CO_2$ and $H_2O$ are adsorbed on the beds, thereby providing an essentially pure $N_2$ product effluent. Following the $N_2$ purification step the reformate is subsequently passed to the N bed section of the PSA unit where $CO_2$ and $H_2O$ are removed. Only a portion of the N beds become saturated with $CO_2$ from the flue gas in the initial adsorption step so that the N beds have sufficient capacity to also remove the $CO_2$ and $H_2O$ contained in the reformate. Additional $CO_2$ adsorption capacity is achieved by passing the reformate stream having a higher $CO_2$ concentration ($\sim$15-20% contained in the reformate) through the bed after the adsorbed bed was exposed to the flue gas stream in the preceding adsorption step (which stream contained $\sim$10-15% $CO_2$). The reformate stream now freed of $CO_2$ and $H_2O$ is passed to a second set of beds designated H beds for final purification and recovery of the $H_2$ product. A portion of the $N_2$ product is used to regenerate the H and N beds to effect a greater recovery of the $H_2$ product. Operation of the integrated PSA system is more fully described herein below. The status and cycle of each of the N and H beds in the FIG. 10 embodiment are set out in Table 7.

The preferred PSA system to be employed in practice of the invention for production of ammonia syngas in accordance with the FIG. 8 embodiment is illustrated in FIG. 10. As shown in FIG. 10 the integrated PSA system comprises six columns, labeled N1 through N6, each containing a bed of adsorbent effective for adsorption of $CO_2$ (and water) and three adsorbent columns, labeled H1, H2, H3, for further purification of a hydrogen-rich stream from which $CO_2$ has been previously removed. Each of the N beds, by appropriate gas flow conduits, can be selectively put into flow communication with an H bed under valve control. The system comprises gas inlet and discharge manifolds connected by valves to the N columns and to the H columns, these being labeled 501 through 512, operated in the manner described below.

TABLE 7

| BED | | | | N-BEDS | | | | |
|---|---|---|---|---|---|---|---|---|
| N1 | | AD1(N2) | | AD2(H2) | | EQ ↓ | DP | ISLE |
| N2 | | IDLE | | AD1(N2) | | | AD2(H2) | |
| N3 | EQ ↑ | EQ2 ↑ | RP | ISLE | | | AD1(N2) | |
| N4 | PURGE | IDLE | | EQ ↑ | EQ2 ↑ | RP | IDLE | |
| N5 | EQ ↓ | DP | IDLE | PURGE | IDLE | EQ ↑ | EQ2 ↑ | RP |
| N6 | | AD2(H2) | | EQ ↓ | DP | IDLE | PURGE | IDLE |

| BED | | | | N-BEDS | | | | |
|---|---|---|---|---|---|---|---|---|
| N1 | PURGE | IDLE | | EQ ↑ | EQ2 ↑ | RP | IDLE | |
| N2 | EQ ↓ | DP | IDLE | PURGE | IDLE | EQ ↑ | EQ2 ↑ | RP |
| N3 | | AD2(N2) | | EQ ↓ | DP | IDLE | PURGE | IDLE |
| N4 | | AD1(N2) | | | AD2(H2) | | EQ ↓ | DP | IDLE |
| N5 | | IDLE | | | AD1(N2) | | | AD2(H2) | |
| N6 | EQ ↑ | EQ2 ↑ | | | RP | | IDLE | | AD1(N2) |

| BED | | | | H-BEDS | | | | |
|---|---|---|---|---|---|---|---|---|
| H1 | | AD (H2) | | IDLE | EQ2 ↓ | DP | PURGE | RP |
| H2 | | PURGE | RP | | AD H2 | | IDLE | EQ2 ↓ | DP |
| H3 | IDLE | EQ2 ↓ | DP | | PURGE | RP | | AD (H2) |

N-Bed Operation

Following is a typical operation of a single N-bed. All six N-beds undergo the same cycle according to the cycle chart in Table 7.

Adsorption 1

Flue gas (line 382, FIG. 8) containing 85-90% $N_2$ enters manifold 502 and passes into the bottom of bed N1 (for example) through valve B2. $CO_2$ and $H_2O$ are adsorbed and pure $N_2$ product exits through valve B6 and manifold 506. A portion of the adsorbent at the top of bed N1 remains unsaturated with $CO_2$ to effect further gas separation in the following step.

Adsorption 2

The reformate (from line 345, FIG. 8) is fed concurrently (to the flue gas stream) to bed N1 through manifold 501 and valve B1. $CO_2$ contained in the reformate (at ~15-25%) and $H_2O$ is held by the adsorbent which is preferably, but not limited to 13X molecular sieve, while the enriched $H_2$ stream exits the top of the bed through valve B7 and manifold 507. This step is terminated once the $CO_2$ front reaches a predetermined height on the bed, leaving a portion of unused adsorbent at the top.

Equalization/Depressurization

After termination of the reformate adsorption step, valve B4 and valve F4 are simultaneously opened. Void space in bed N1 originally at adsorption pressure exits concurrent to the feed through valve C4 into manifold 504 and enters bed N5 countercurrently through valve F4. The N5 bed was originally at atmospheric pressure. The pressure is equalized between beds N1 and N5 to some intermediate level. Any $CO_2$ in the N1 bed void space gas is adsorbed on the unused portion at the top of bed N1 so that the gas passing into bed N5 is mainly $H_2$ with some CO and $CH_4$. The $CO_2$-saturated N1 bed is then depressurized countercurrently to atmospheric pressure. The depressurization gas exits the bed through valve B3 and manifold 503. It is then passed through valve V10 and into manifold 3A where it is fed to the reformer furnace as fuel.

Purge

A portion of the product $N_2$ is returned to the PSA system through valve V30. The $N_2$ enters bed N1 which is at atmospheric pressure countercurrent to feed direction through manifold 505 and valve B5. As the $N_2$ is passed through bed N1 it desorbs the $CO_2$ from the molecular sieve thereby regenerating the bed. The $N_2/CO_2$ mixture leaves the adsorber through valve B3 and manifold 503.

Equalization/Repressurization

The pressure on bed N1 is increased from atmospheric to some intermediate level by equalizing it with bed N3. Void space gas from bed N3 is passed through manifold 504 into bed N1 countercurrently. At the termination of this step, bed N1 is again equalized to a higher pressure with bed H1 in the H-bed section of the PSA. Void space gas in the N1 bed discharges through valve J3 and manifold 510 into manifold 504 and passed countercurrently into bed N1. A portion of the product $N_2$ is then passed through the purge header (manifold 505) to bring bed N1 to its adsorption pressure. At the termination of this step the cycle is repeated.

H-bed Operation

Following is a typical operation of a single H-bed. All three H-beds undergo the same cycle according to the cycle chart in Table 7.

Adsorption

The $H_2$-rich effluent from one of the N-beds then on-stream (say N1) enters manifold 508 and is passed into the bottom of bed H1 through valve J1. The remaining impurities in this stream, mainly CO and $CH_4$, are adsorbed on the molecular sieve adsorbent in bed H1. The substantially pure $H_2$ product exists through valve J5 into manifold 512 from which it may be mixed with the $N_2$ to form the desired ammonia synthesis gas. The preferred adsorbent employed in the H-beds is 5A molecular sieve.

Equalization/Depressurization

The portion of the adsorbent bed left unsaturated after the adsorption step is used to retain the contaminants in the void space gas during the concurrent equalization. Here, the pressure on bed H1 is decreased to some intermediate level by equalizing it with bed N4 which was originally at a lower pressure. Gas from bed H1, mainly $H_2$, enters manifold 510 through valve J3 and is passed through the equalization header of the N-bed section (manifold 504).

Subsequent to the equalization step bed H1 is countercurrently depressurized to atmospheric pressure by opening valve J2. The depressurization gas flows through manifold 509 and is sent to the reformer furnace as fuel.

Purge/Repressurization

The adsorbed gases on bed H1, primarily CO and $CH_4$, removed as a portion of the product $N_2$ in manifold 511, is passed countercurrently through bed H1. The combined purge gas flows out through manifold 509 and is sent to fuel.

After the purge step is complete, valve J2 is closed and bed H1 is repressurized with $N_2$ through valve J3. At the termination of this step, the cycle is repeated. A continuous flow of product $H_2$ is maintained since the adsorption steps in the N and H beds are synchronized. Because $N_2$ is used in various stages of the PSA cycle, a holding tank is necessary to maintain a smooth flow of $N_2$ to the $NH_3$ synthesis loop. The position of the various valve during a single cycle is shown in Table 8; the designation O indicates that the valve is open, while blanks indicate closed valves.

TABLE 8

VALVE POSITION FOR FIG. 10
0 = OPEN - [OTHERWISE CLOSED]

| UNIT TIME | B1 | B2 | B3 | B4 | B5 | B6 | B7 | C1 | C2 | C3 | C4 | C5 | C6 | C7 | D1 | D2 | D3 | D4 | D5 | D6 | D7 | E1 | E2 | E3 | E4 | E5 | E6 | E7 | F1 | F2 | F3 | F4 | F5 | F6 | F7 |
|---|---|---|---|---|---|---|---|---|---|---|---|---|---|---|---|---|---|---|---|---|---|---|---|---|---|---|---|---|---|---|---|---|---|---|---|
| 1 | O | O | | | | | | | | | | | | | | | | O | | | | O | O | | | | | | | | | O | | | |
| 2 | O | O | | | | | | | | | | | | | | | | O | | | | | O | O | | | | | | | | O | | | |
| 3 | O | O | | | | | | | | | | | | | | | | O | | | | | | O | | | | | | | O | | | | |
| 4 | O | O | | | | | | | | | | | | | | | | O | | | | | | | | | | | | | O | | | | |
| 5 | O | O | | | | | | | | | | | | | | | | | O | | | | | | | | | | | | | | | | |
| 6 | O | O | | | | | | | | | | | | | | | | | O | | | | | | | | | | | | | | | | |
| 7 | O | | | | | | | | | O | | O | | | | | | | | | | | | | O | | | | | | O | O | | | |
| 8 | O | | | | | | | | | O | | O | | | | | | | | | | | | | O | | | | | | O | O | | | |
| 9 | O | | | | | | | | | O | | O | | | | | | | | | | | | | O | | | | | | | | | | |
| 10 | O | | | | | | | | | O | | O | | | | | | | | | | | | | O | | | | | | | | | | |

TABLE 8-continued

VALVE POSITION FOR FIG. 10
0 = OPEN - [OTHERWISE CLOSED]

| Unit Time | | | | | | | | | | |
|---|---|---|---|---|---|---|---|---|---|---|
| 11 | 0 | | 0 | 0 | 0 | | | | 0 | |
| 12 | 0 | | 0 | 0 | 0 | | | | 0 | |
| 13 | | 0 | 0 | | 0 | 0 | 0 | | | 0 |
| 14 | | 0 | 0 | | 0 | 0 | 0 | | | 0 |
| 15 | 0 | | 0 | | 0 | 0 | 0 | | | 0 |
| 16 | 0 | | 0 | | 0 | 0 | 0 | | | 0 |
| 17 | | | 0 | | 0 | 0 | 0 | | | 0 |
| 18 | | | 0 | | 0 | 0 | 0 | | | 0 |
| 19 | 0 | 0 | | 0 | | 0 | | 0 | 0 | 0 |
| 20 | 0 | 0 | | 0 | | 0 | | 0 | 0 | 0 |
| 21 | | | 0 | | 0 | | | 0 | 0 | 0 |
| 22 | | | 0 | | 0 | | | 0 | 0 | 0 |
| 23 | | | | | 0 | | | 0 | 0 | 0 |
| 24 | | | | | 0 | | | 0 | 0 | 0 |
| 25 | | 0 | | 0 | 0 | | 0 | | 0 | 0 0 0 |
| 26 | | 0 | | 0 | 0 | | 0 | | 0 | 0 0 0 |
| 27 | | 0 | | | | 0 | 0 | | 0 | 0 0 0 |
| 28 | | 0 | | | | 0 | 0 | | 0 | 0 0 0 |
| 29 | | | 0 | | | | | 0 | 0 | 0 0 0 |
| 30 | | | 0 | | | | | 0 | 0 | 0 0 0 |
| 31 | | | | 0 | | 0 | 0 | | 0 | 0 0 |
| 32 | | | | 0 | | 0 | 0 | | 0 | 0 0 |
| 33 | | | | 0 | | | | 0 | 0 | 0 0 |
| 34 | | | | 0 | | | | 0 | 0 | 0 0 |
| 35 | | | | | 0 | | | | 0 | 0 0 |
| 36 | | | | | 0 | | | | 0 | 0 0 |

| | Valve Number | | | |
|---|---|---|---|---|
| UNIT TIME | G G G G G G G  1 2 3 4 5 6 7 | J J J J J  1 2 3 4 5 | K K K K K  1 2 3 4 5 | L L L L L  1 2 3 4 5 |
| 1 | | 0    0 | 0    0 | |
| 2 | | 0    0 | 0    0 | |
| 3 | | 0    0 | 0    0 | 0 |
| 4 | | 0    0 | 0    0 | 0 |
| 5 | | 0    0 | 0       0 | 0 |
| 6 | | 0    0 | 0       0 | 0 |
| 7 | 0 | | 0    0 | 0  0 |
| 8 | 0 | | 0    0 | 0  0 |
| 9 | 0 | 0 | 0    0 | 0  0 |
| 10 | 0 | 0 | 0    0 | 0  0 |
| 11 | | 0 | 0    0 | 0 |
| 12 | | 0 | 0    0 | 0 |
| 13 | 0 0 | 0 0 | | 0  0 |
| 14 | 0 0 | 0 0 | | 0  0 |
| 15 | | 0 0 | 0 | 0  0 |
| 16 | | 0 0 | 0 | 0  0 |
| 17 | | 0 | 0 | 0  0 |
| 18 | | 0 | 0 | 0  0 |
| 19 | 0 | 0 0 | 0 0 | |
| 20 | 0 | 0 0 | 0 0 | |
| 21 | 0 | 0 0 | 0 0 | 0 |
| 22 | 0 | 0 0 | 0 0 | 0 |
| 23 | 0 | 0 0 | 0 | 0 |
| 24 | 0 | 0 0 | 0 | 0 |
| 25 | | 0 | 0 | 0  0 |
| 26 | | 0 | 0 | 0  0 |
| 27 | 0 | 0 | 0 | 0  0 |
| 28 | 0 | 0 | 0 | 0  0 |
| 29 | | 0 | 0 | 0 |
| 30 | | 0 | 0 | 0 |
| 31 | 0 0 | 0 0 | | 0  0 |
| 32 | 0 0 | 0 0 | | 0  0 |
| 33 | 0 0 | 0 0 | 0 | 0  0 |
| 34 | 0 0 | 0 0 | 0 | 0  0 |
| 35 | 0 0 | 0 | 0 | 0  0 |
| 36 | 0 0 | 0 | 0 | 0  0 |

A hydrogen recovery of 70–75% is effected by minimizing product loss with equalization steps and by using $N_2$ as purge gas in the PSA cycle. Since a major portion of the synthesis gas cost can be attributed to the production and purification of the $H_2$ Co-product every recovery percentage increase provides a tremendous economic benefit. On the other hand, $N_2$ recoveries as lows as 50–60% do not even impact the economics significantly.

Use of the $CO_2$ removal adsorbent beds to both purify the flue gas and reformate removes the need for a separate flue gas PSA system and lowers the equipment investment accordingly. "Free" $CO_2$ capacity is obtained by passing the higher $CO_2$ concentration of the reformate—over the adsorbed bed already in equilibrium with a 15–25% $CO_2$ concentration from the limited flue gas adsorption step.

What is claimed:

1. The method for recovering contained nitrogen from flue gas obtained in combustion of hydrocarbon fuel, which method comprises the steps of cooling the hot flue gas discharged from said combustion to effect condensation of contained water, separating out the liquid condensate, compressing the remaining vapor and subjecting said vapor to deoxygenation by reaction with hydrogen to convert residual-free oxygen therein to water, and subjecting the deoxygenated vapor to pressure swing adsorption for removal therefrom of contained contaminants including $CO_2$ and water with resulting production and recovery of substantially pure nitrogen.

2. The method as defined in claim 1 wherein the starting flue gas is that obtained from a furnace employed in catalytic reforming of a methane-rich hydrocarbon charge, wherein the reformate is subjected to pressure swing adsorption effecting removal of residual hydrocarbons and carbon oxide gases therefrom with the recovery of a substantially pure hydrogen product stream, a portion of said hydrogen product stream being utilized in the recited deoxygenation reaction.

3. The method as defined in claim 2 wherein a portion of said substantially pure hydrogen product stream is blended with the recovered substantially pure nitrogen to provide a gas mixture for production of $NH_3$.

4. The method as defined in claim 2 wherein the removal of $CO_2$ from said flue gas and the removal of $CO_2$ from said reformate are separately carried out in separate adsorbent beds.

5. The method as defined in claim 2 wherein said reformate prior to being subjected to pressure swing adsorption is freed of contained carbon monoxide by catalytic water gas shift conversion to $CO_2$.

6. The method as defined in claim 5 wherein the reformate is that obtained by subjecting a major portion of said methane-rich hydrocarbon charge to a first primary reforming step in the presence of added steam and subjecting a minor portion of said methane-rich hydrocarbon charge to a second primary reforming step in the presence of added steam wherein heat for said second primary reforming step is provided by indirect heat exchange with the combined products from said first and second primary reforming steps.

7. The method as defined in claim 2 wherein the removal of $CO_2$ from said flue gas and the removal of $CO_2$ from said reformate are effected in consecutive adsorption steps in the same adsorption bed.

* * * * *